United States Patent Office 2,969,385
Patented Jan. 24, 1961

2,969,385

(SULFONYLDIALKYLENE)DIBENZOATES

Donald M. Young, Geneva, Switzerland, and Christian F. Horn, New York, N.Y., assignors to Union Carbide Corporation, a corporation of New York No Drawing. Filed Oct. 7, 1957, Ser. No. 688,415

9 Claims. (Cl. 260—470)

This invention relates to novel compounds that are useful in the preparation of high melting and readily dyeable synthetic textile fibers of high strength, resilience and other desirable properties, and have further utility as intermediates in the preparation of plasticizers for vinyl-type resins.

The compounds of the invention are characterized by the general formula

in which the R's are saturated divalent alkylene radicals containing from two to five carbon atoms and the X's are hydrogen or saturated lower alkyl radicals.

The diaralkylene monosulfones that are preferred particularly for use in forming synthetic textile fibers are those having a symmetrical structure in which the X's are methyl groups and the R's are unsubstituted polymethylene chains, e.g., dimethyl 4,4'-[sulfonyldiethylene]dibenzoate and dimethyl 4,4'-[sulfonyl-bis(trimethylene)]dibenzoate. Also included among the diaralkylene monosulfones that are suitable as starting materials are the next higher homologues, dimethyl 4,4'-[sulfonyl-bis(tetramethylene)]dibenzoate and dimethyl 4,4'-[sulfonyl-bis(pentamethylene)]dibenzoate as well as those having branched chain alkylene radicals such as dimethyl beta, beta'-sulfonyl-bis(p-propylbenzoate) and dimethyl gamma, gamma'-sulfonyl-bis[p-(beta,beta'-dimethylpropyl)benzoate]. Higher alkyl diesters such as ethyl, propyl, etc. are also useful in the preparation of synthetic textile fibers so long as the terminal alkyl radicals are capable of forming alcohols boiling below about 200° C.

The diaralkylene monosulfones can be prepared in several ways. One method of preparation that has been found suitable involves reacting a chloride

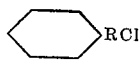

in which the R is as defined with reference to Formula I, with acetyl chloride in the presence of aluminum chloride as a catalyst and carbon disulfide as the reaction medium to form the corresponding acetophenone, oxidizing the acetophenone with an alkaline hypobromite solution and then acidifying with hydrochloric acid to form the corresponding para-benzoic acid, reacting the latter with sodium sulfide to form the corresponding 4,4'-(thiodialkylene)dibenzoic acid and then oxidizing with peracetic acid or other suitable oxidizing agent to convert the thio acid into the corresponding sulfonyl dibenzoic acid. If a diester is desired, the sulfonyl dibenzoic acid can be esterified with the appropriate alcohol. The entire sequence of reaction is illustrated as follows:

II(A)  $ClRC_6H_5 + CH_3COCl$

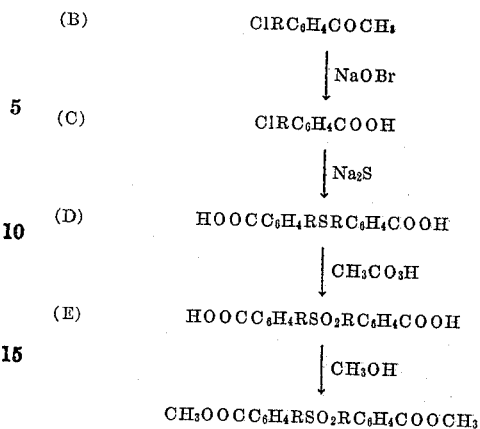

The R's, as in Formula I, stand for saturated divalent alkylene radicals containing from two to five carbon atoms.

The compounds of the invention are distinguished by a high thermal stability, a characteristic that is important in the melt polymerization or copolymerization that is involved in the preparation of synthetic textile fibers. They are capable of forming excellent fibers by polycondensation with various diols and diamines and are also useful in modifying polyethylene terephthalate fibers and filaments to make them more receptive to dyeing without appreciably lowering their melting points.

These and other advantages, as well as the utility of the compounds of the invention, and a more detailed description of a preferred method of preparation, will become apparent from the following examples included to set forth the best mode now contemplated for carrying out the invention.

EXAMPLE 1

*Part A.—Preparation of para-(2-chloroethyl) acetophenone*

Carbon disulfide (300 cc.), aluminum chloride (83 grams) and acetyl chloride (47 cc.) were placed in a one-liter four-neck flask, equipped with a stirrer, dropping funnel, thermometer, and reflux condenser. The materials were mixed thoroughly after the flask was set in an ice-bath. When the temperature in the flask was between 5 and 10° C., a mixture of acetyl chloride (95 cc.) and (2-chloroethyl)benzene (94 grams) was added as rapidly as possible. Stirring was continued until no more hydrogen chloride was formed (2–2.5 hours). Thereafter, the reaction mixture was poured on crushed ice and the organo-aluminum chloride complex decomposed with concentrated hydrochloric acid.

The carbon disulfide layer was separated from the aqueous layer, which was then extracted twice with benzene. The combined benzene and carbon disulfide layers were washed with dilute hydrochloric acid, 10% aqueous caustic solution and water. After drying with calcium chloride, the solvents were removed on the steam bath and the remaining product fractionated at reduced pressure. Para-(2-chloroethyl)acetophenone was obtained in 76% yield as a slightly pink liquid having a boiling point at 108 to 109° C. (0.8 mm.) and a refractive index n 20/D 1.5528.

*Part B.—Preparation of para-(2-chloroethyl)benzoic acid*

An alkaline hypobromite solution, prepared from 240 grams of bromine, 165 grams of sodium hydroxide, 1000 cc. of 1,4-dioxane and 1400 cc. water was placed in a five-liter four-neck flask, equipped with stirrer, condenser, dropping funnel, and thermometer and was cooled to 0° C. At that temperature, 91 grams of para-(2-chloroethyl)acetophenone, prepared as described in Part A, was added dropwise accompanied by stirring. The agitation was continued and the temperature maintained at 0° C., until the hypobromite was exhausted (4–8 hours).

The solution was acidified with an excess of hydrochloric acid to pH 1 and the precipitated acid filtered from the aqueous solution and bromoform. The aqueous layer was extracted with ether, which, after evaporation, yielded more crude acid. The combined crops were recrystallized from a 1:1 mixture of benzene-petroleum ether having a boiling point between 88 and 98° C. and para-(2-chloroethyl)benzoic acid was obtained in 81% yield as colorless needles having a melting point at 187.5 to 188° C.

Part C.—*Preparation of 4,4'-(thiodiethylene)dibenzoic acid*

Para-(2-chloroethyl)benzoic acid (110 grams) was dissolved in 300 cc. water and 420 cc. alcohol and heated to refluxing in a two-liter four-neck flask, equipped with condenser, dropping funnel, stirrer, and thermometer. A solution of 165 grams of $Na_2S.3H_2O$ in 250 cc. water and 300 cc. ethanol was added over a period of one hour dropwise and the mixture was agitated gently. After the addition was completed, the reaction mixture was further refluxed for two hours, then filtered hot and acidified with concentrated hydrochloric acid to pH 1.

Crude 4,4'-(thiodiethylene)dibenzoic acid was obtained in quantitative yield. It had a melting point of 270° C. No purification was undertaken since sodium chloride was the only impurity which was removed during the two following steps.

Part D.—*Preparation of 4,4'-(sulfonyldiethylene)dibenzoic acid*

To a solution of 60 grams of 4,4'-(thiodiethylene)-dibenzoic acid in 300 cc. dimethylformamide, 170 cc. of 25% peracetic acid in acetone was slowly added at 50 to 60° C. accompanied by gentle agitation. After the addition was completed (twenty-five minutes), the reaction mixture was kept at this temperature for twenty-four hours. Thereafter the sulfone was precipitated completely from this solution by addition of two liters of water. Thus, 4,4'-(sulfonyldiethylene)dibenzoic acid was obtained in a quantitative yield. It had a melting point, with decomposition, at 353° C.

Part E.—*Preparation of dimethyl 4,4'-(sulfonyldiethylene)dibenzoate*

4,4'-(sulfonyldiethylene)dibenzoic acid (53 grams) was dispersed in 2000 grams of methanol in a five-liter three-neck flask, equipped with agitator, reflux condenser, and dropping funnel. Sulfuric acid (70 grams) was added very slowly to the mixture. The dispersion was then refluxed over a period of thirty hours accompanied by active agitation. Thereafter, the dimethyl ester of the sulfone was filtered and the filtrate poured on crushed ice to precipitate the ester still dissolved. Both crops were combined, washed with methanol several times, dried, and recrystallized from ethyl acetate.

Dimethyl 4,4'-(sulfonyldiethylene)dibenzoate was obtained in 95% yield as fine, colorless needles having a melting point at 190.5 to 191.5° C. Carbon and hydrogen contents for

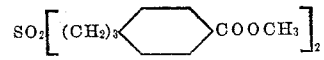

or $C_{20}H_{22}O_6S$ are:

Calculated—C=61.55% b.w.; H=5.69% b.w. Found on analysis—C=61.47% b.w.; H=5.69% b.w.

EXAMPLE 2

Part A.—*Preparation of para-(3-chloropropyl)acetophenone*

Para-(3-chloropropyl)benzene (121 grams), acetyl chloride (188 grams), carbon disulfide (400 grams) and aluminum chloride (100 grams) were reacted in the manner described in Part A of Example 1.

Para-(3-chloropropyl)acetophenone was obtained in 86.5% yield as a colorless liquid having a boiling point at 113° C. (1 mm.) and a refractive index n 20/D 1.5443.

Part B.—*Preparation of para-(3-chloropropyl)benzoic acid*

Para-(3-chloropropyl)acetophenone (20 grams), bromine (48 grams), sodium hydroxide (33 grams), 1,4-dioxane (200 cc.) and water (280 cc.) were reacted as described in Part B of Example 1.

Para-(3-chloropropyl)benzoic acid was obtained in 75% yield after one recrystallization from an 8:2 mixture of benzene and petroleum ether. It had a melting point of 137.5 to 138.5° C.

Part C.—*Preparation of 4,4'-[thio-bis(trimethylene)]dibenzoic acid*

Para-(3-chloropropyl)benzoic acid (212 grams) dissolved in 1000 cc. ethanol and 10 cc. water, and $Na_2S.3H_2O$ (264 grams) dissolved in 400 cc. water and 250 cc. ethanol were subjected to the same reaction procedure as described in Part C of Example 1.

4,4'-[thio-bis(trimethylene)]dibenzoic acid was obtained in 99% yield. It had a melting point of 229 to 230° C. and was further reacted without purification.

Part D.—*Preparation of 4,4'-sulfonyl-bis(trimethylene)dibenzoic acid*

4,4' - [thio - bis(trimethylene)]dibenzoic acid (172 grams) dissolved in 1500 grams dimethylformamide, and 25% peracetic acid (456 grams) in acetone were subjected to the same reaction procedure as described in Part D of Example 1.

4,4'-sulfonyl-bis(trimethylene)dibenzoic acid was obtained in 98% yield. It had a melting point of 277 to 277.5° C. The compound was subjected to esterification without further purification.

Part E.—*Preparation of dimethyl 4,4'-sulfonyl-bis(trimethylene)dibenzoate*

4,4'-[sulfonyl-bis(trimethylene)]dibenzoic acid (183 grams), methanol (2800 grams) and sulfuric acid (80 grams) were subjected to the same reaction procedure as described in Part E of Example 1.

After two recrystallizations from methanol, the dimethyl ester was obtained in 94% yield. It had a melting point of 123 to 124° C. Carbon and hydrogen contents for

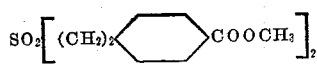

or $C_{22}H_{26}O_6S$ are:

Calculated—C=63.20% b.w.; H=6.27% b.w. Found on analysis—C=63.03% b.w.; H=6.35% b.w.

It is to be expected that numerous modifications will readily become apparent to those skilled in the art upon reading this description. All such modifications are intended to be included within the scope of the invention as defined in the appended claims.

We claim:

1. Compound having the general formula

wherein the R's are saturated divalent alkylene hydrocarbon radicals containing from two to five carbon atoms and the X's are members selected from the group consisting of hydrogen and saturated lower alkyl radicals.

2. Compound as defined in claim 1 wherein the X's are methyl radicals.

3. Compound as defined in claim 1 wherein the X's are hydrogen.

4. Compound as defined in claim 1 wherein the R's are ethylene radicals.

5. Compound as defined in claim 1 wherein the R's are trimethylene radicals.

6. 4,4'-(sulfonyldiethylene)dibenzoic acid.

7. Dimethyl 4,4'-(sulfonyldiethylene)dibenzoate.

8. 4,4'-sulfonyl-bis(trimethylene)dibenzoic acid.

9. Dimethyl 4,4'-sulfonyl-bis(trimethylene)dibenzoate.

References Cited in the file of this patent

UNITED STATES PATENTS

| | | |
|---|---|---|
| 2,393,327 | Langkammerer | Jan. 22, 1946 |
| 2,552,269 | Emerson et al. | May 8, 1951 |
| 2,571,251 | Jones | Oct. 16, 1951 |
| 2,640,848 | Harman et al. | June 2, 1953 |
| 2,720,502 | Caldwell | Oct. 11, 1955 |